United States Patent
Bleakley et al.

[11] Patent Number: 6,159,381
[45] Date of Patent: Dec. 12, 2000

[54] WASTE PAPER TREATMENT PROCESS

[76] Inventors: Ian Stuart Bleakley, 30 Trembear Road, St Austell Cornwall PL25 4BJ; Hannu Olavi Ensio Toivonen, 66 Penrice Parc, St Austell Cornwall PL25 3NA, both of United Kingdom

[21] Appl. No.: 09/013,757

[22] Filed: Jan. 27, 1998

Related U.S. Application Data

[63] Continuation-in-part of application No. 08/800,849, Feb. 14, 1997, Pat. No. 5,830,364, which is a continuation-in-part of application No. 08/630,657, Apr. 11, 1996, abandoned.

[51] Int. Cl.⁷ .................................................... C02F 1/52
[52] U.S. Cl. .................... 210/712; 162/5; 162/8; 162/29; 162/189; 210/713; 210/717; 210/726; 210/917; 210/928
[58] Field of Search .................................. 162/5, 29, 189, 162/190, 8; 210/702, 710, 711, 712, 716, 717, 724, 726, 737, 917, 928, 713

[56] References Cited

U.S. PATENT DOCUMENTS

| | | | |
|---|---|---|---|
| 3,354,028 | 11/1967 | Illingworth et al. | 162/5 |
| 3,639,206 | 2/1972 | Spruill | 162/29 |
| 4,115,188 | 9/1978 | O'Brien et al. | 162/190 |
| 4,780,179 | 10/1988 | Clement | 162/5 |
| 4,865,690 | 9/1989 | Bernard et al. | 162/4 |
| 5,262,006 | 11/1993 | Andersson et al. | 162/147 |
| 5,558,782 | 9/1996 | Bleakley et al. | 210/712 |
| 5,683,590 | 11/1997 | Phipps | 210/761 |
| 5,830,364 | 11/1998 | Bleakley | 210/712 |

*Primary Examiner*—Peter A. Hruskoci
*Attorney, Agent, or Firm*—Finnegan, Henderson, Farabow, Garrett & Dunner, L.L.P.

[57] ABSTRACT

According to the present invention there is provided a method of treating reject from a plant for de-inking waste paper which reject comprises in an aqueous medium a mixture of suspended solids comprising at least ink particles, inorganic particles and fibers, which method includes the steps of (i) chemically treating an aqueous suspension comprising said reject by adding to the aqueous suspension a source of alkaline earth metal ions and a source of carbonate ions to react with the alkaline earth metal ions to form therein a composite particulate material comprising a substantially white insoluble alkaline earth metal carbonate compound precipitated by the said reaction which compound bonds to and entrains material comprising ink particles, inorganic particles and fibers contained in said reject, whereby the darkness of the reject is reduced by formation of the precipitate of the carbonate compound; and (ii) recovering the composite particulate material and delivering the composite particulate material for re-use as a pigment in a process for making or coating cellulosic sheet material.

10 Claims, 1 Drawing Sheet

WASTE PAPER TREATMENT PROCESS

CROSS REFERENCE TO RELATED APPLICATIONS

This application is a continuation in part of pending U.S. patent application Ser. No. 08/800849 filed Feb. 14, 1997, now U.S. Pat. No. 5,830,364 which is a continuation in part of U.S. patent application Ser. No. 08/630,657 filed Apr. 11, 1996 now abandoned.

BACKGROUND OF THE INVENTION

1. Field of the Invention

This invention relates to a process for treating waste paper and, more particularly, is concerned with a process for recovering a useful product from aqueous rejects which contain suspended solid material and which are derived from a plant for de-inking printed waste paper, de-inking plant waste being especially difficult to treat.

A process for converting waste paper into a pulp suitable for re-use will often include one or more operations designed, for example, to separate printing ink from the cellulosic fibres in the waste paper. Generally, in a plant for de-inking waste paper, the waste paper is first pulped, for example in a pulper provided with a low attrition rotor, in water containing various chemical reagents, at a consistency which is usually in the range from about 8% to about 18% by dry weight of waste paper. The chemical reagents used generally include sodium hydroxide which causes the fibers to swell and saponifies most commonly used printing ink vehicles, sodium silicate which acts as a pH buffer and agglomerates detached ink particles to a convenient size, and a surfactant which aids wetting and dispersion of the ink particles. The pulper is generally operated at a temperature in the range from 55° C. to 70° C. and at a pH in the range from 9 to 11. On completion of the pulping operation the pulp is usually diluted with water to about 4%–5% by weight of dry solids and then reconcentrated to a consistency of about 14%–16% by weight of dry solids: the dilution and subsequent reconcentration is advantageous because the dilute suspension is easier to pump from the pulper to the next stage, and because it makes it possible to return a proportion of the hot water and chemicals to the pulper.

The pulp suspension is then passed to a system of screens which remove relatively heavy foreign bodies, such as staples, paper clips and particles of grit, and also lightweight contaminants, such as plastics materials, and "stickies" which arise from adhesives used in paper coating, binding or laminating, and from hydrophobic reagents, such as sizing agents.

The suspension passing through the screens is then fed to a treatment plant which usually comprises one or more froth flotation cells, or one or more washing units, or a combination of flotation cells and washing units.

For example, a typical treatment might comprise one or more froth flotation cells, each of which is provided with an impeller and means to introduce air in the form of fine bubbles in the vicinity of the impeller. An additional chemical, known as a collector, is added to the pulp suspension prior to the flotation operation. The collector may be, for example, a fatty acid soap or a non-ionic surfactant such as an ethylene oxide/propylene oxide copolymer. The collector attaches itself preferentially to the ink particles, rendering them hydrophobic, so that they have greater affinity for the air bubbles than for the water, and are lifted to the surface by the bubbles as they rise through the suspension. It may be necessary, in order to provide a sufficiency stable foam, to add also a water-soluble calcium salt to ensure that the water has a hardness of at least 200 mg of $CaCO_3$. Ink particles having sizes in the range from about 20 μm to about 200 μm are concentrated in the froth which overflows from the top of the flotation cells, while a pulp suspension depleted in ink is withdrawn from the bottom. The pulp suspension from the bottom of the flotation cells is then washed with water, and subsequently dewatered, to remove as much as possible of the remaining ink residue. The dewatered pulp is then generally dispersed with a surfactant, which may be, for example, of the nonylphenol ethoxylate or ethoxylated alcohol type. The dispersion is effected by treating the mixture of pulp and dispersing agent with steam to raise its temperature to a value within the range 50–90° C., and subjecting the hot mixture to intense mechanical agitation whereby remaining ink particles are generally reduced in size to below about 20 m, at which size they remain in suspension and become invisible to the naked eye. The pulp containing finely dispersed ink particles is then passed through a fine slotted screen to remove any agglomerates or remaining sticky or resinous material and finally dewatered to produce a substantially de-inked pulp. The water recovered from the dewatering operations is generally cloudy as a result of its content of fine particulate material which may comprise, for example, inorganic filler particles or organic particles such as ink or fine fibres. It is necessary to remove as much as possible of this particulate material before this water is suitable for recycling for re-use in earlier stages of the de-inking process. The cloudy water may be cleaned, for example, in microflotation cells in which fine bubbles of air are injected at the base of the cells and the particulate material is carried upwards by air bubbles which attach themselves thereto.

The treatment plant reject, which is usually in the form of a suspension, or slurry, comprising the froth product from a flotation stage or the suspension that has passed through the screen of a washing stage generally contains, in addition to the ink particles, a substantial proportion of the cellulose fibers and inorganic filler (pigment) particles which were originally present in the waste paper. These filler particles generally consist predominantly of a mixture of kaolin clay and calcium carbonate in various proportions, although other inorganic filler particles such as talc, calcium sulphate or titanium dioxide may also be present in minor proportions.

The reject or effluent stream from a waste paper de-inking plant is usually known as a 'sludge'. Such a sludge includes, in addition to the insoluble, potentially useful particulate and fibrous solid material, inking materials such as carbon and various organic inks, other organic substances such as latices and other adhesives, sizing agents and the like. Such a sludge is generally a sticky, highly discolored or gray mass. Furthermore, the water of the sludge contains a variety of soluble substances which reduce the usability of the water.

Thus, the useful inorganic particulate materials contained in the sludge from a de-inking plant are highly discolored and difficult to separate, difficult to dewater and are associated with water undesirably containing a high level of dissolved species. In consequence, a sludge from a de-inking sludge is usually regarded as an unusable waste and in the prior art has generally been discarded or incinerated to reduce the volume of waste, the ash then being discarded.

Hitherto, there has been, therefore, a loss to the paper maker of potentially useful inorganic particulate materials. Also, the paper maker has had to meet the expense of disposing of the treatment plant reject in a manner which has no undesirable effects on the environment.

2. Summary of the prior art

U.S. Pat. No. 4,115,188 describes a process for chemically treating waste water from a paper mill. In the disclosure in this prior patent it is stated that the waste water treated may be "from the various pulpings, refinings, deinkings, cleanings, dilutions, etc, involved in either a primary or secondary paper mill paper-making process". The implication is that it is not the primary effluent from a de-inking plant which is treated but rather a dilute stream in which waste from a de-inking plant might be only one of various constituents. The darkness or composition of the waste water treated is not discussed. In the described process the waste water is treated by adding an acid, preferably sulphuric acid, and then adding an alkali, preferably calcium hydroxide. The changes in pH produced cause the solids suspended in the waste water to be flocculated which allows them to be more easily separated eg by filtration, decantation, sedimentation etc thereby allowing the waste water to be clarified. The patent description contemplates the possibility of utilizing the separated solids in a number of ways, including providing a pulp source for low grade paper which may be re-used in the paper making process. The patent description contemplates the formation of some calcium sulphate as "ash" as part of the separated solids. However, such formation appears not to be deliberate but rather to be incidental to the flocculation effect caused by pH changes. In any case, in the preferred embodiment of the patent description 320 parts per million $H_2SO_4$ and 250 parts per million slaked lime are added which will produce $CaSO_4$ in a concentration of about 500 parts per million. $CaSO_4$ has an appreciable solubility in water, viz about 1600 parts per million at room temperature. Therefore all $CaSO_4$ produced as in the preferred embodiment of the prior art described in U.S. Pat. No. 4,115,188 is likely to dissolve rather than precipitate. The amount of added acid and alkali in the preferred embodiment suggest that the solids concentration of the treated waste water is about 0.1% to 0.2% by weight.

U.S. Pat. No. 3,354,028 describes a process for clarifying effluent derived from a process for de-inking printed paper. The objective of the process, is clearly to recover in a clean and reusable state the water which has been used in the process for de-inking the printed waste paper. It is noted in the reference that the liquid effluent from a de-inking plant typically includes a suspension of fine particulate materials in water. These particulate materials may be colloidal or non-colloidal, and may according to the reference comprise ink (both ink vehicle and pigment), paper fibres, paper fillers, dust, dirt and other waste solid and liquid material. This reference is principally concerned with the colloidal material, ie that having particles in the size range from 1 nm to 100 nm. The liquid effluent generally has a high turbidity and an object of the process described is to reduce this turbidity. The process described in this reference comprises chemically reversing the effluent pH, ie by raising the pH, and then lowering it, or vice versa. The pH is preferably raised with the aid of an alkali metal or alkaline earth metal hypochlorite, especially sodium, potassium or calcium hypochlorite. The result of this treatment is to flocculate the suspended fine material in the effluent suspension to give a good separation between solid matter and clear water. The flocculated solid matter may be separated from the water either by gravitational sedimentation or by froth flotation. The de-inking process generally precedes the step of flocculating the fine solid material in the effluent suspension. The process described in this reference is concerned solely with recovering the water from an aqueous effluent suspension from a printed waste paper de-inking process in a clean and reusable form. It is almost totally silent about what happens to the flocculated fine solid material after it has been separated from the clarified water. This specification gives no help at all to the skilled reader as to how he might recover and reuse the flocculated solid material for example in a paper making process.

SUMMARY OF THE PRESENT INVENTION

It is a first object of the present invention to provide a process for the treatment of a suspended solids containing aqueous effluent or reject derived from a plant for the treatment of waste paper by de-inking which allows the fines contained in the effluent or reject to be recovered in a form in which such fines may be reused in a paper making process.

It is a second object of the present invention to provide a process for the recycling to a paper making process of a composite material containing solids recovered from an effluent or reject from a plant for the treatment of waste paper.

It is a third object of the present invention to provide a method for the treatment of an aqueous suspension derived from an effluent or reject from a waste paper de-inking plant in which water forming the aqueous medium of the aqueous suspension may be separated from the solids suspended therein and may be rendered more suitable for recycling and reuse.

These and other objects, which will become apparent, are met by the method according to the present invention.

According to the present invention there is provided a method of treating reject from a plant for de-inking waste paper which reject comprises in an aqueous medium a mixture of suspended solids comprising at least ink particles, inorganic particles and fibers, which method includes the steps of (i) chemically treating an aqueous suspension or slurry comprising said reject by adding to the aqueous suspension a source of alkaline earth metal ions and a source of carbonate ions to react with the alkaline earth metal ions to form therein a composite particulate material comprising a substantially white insoluble alkaline earth metal carbonate compound precipitated by the said reaction which compound bonds to and entrains material comprising ink particles, inorganic particles and fibres contained in said reject, whereby the darkness of the reject is reduced by formation of the precipitate of the carbonate compound; and (ii) recovering the composite particulate material and delivering the composite particulate material for refuse as a pigment in a process for making or coating cellulosic sheet material.

The cellulosic sheet material may comprise paper or board or like material.

The precipitated carbonate compound may be formed in a known way. Addition of a carbon dioxide containing fluid to provide carbonate ions to an alkaline earth metal hydroxide, eg calcium hydroxide, in the said suspension to provide alkaline earth metal ions is preferred to form the alkaline earth metal carbonate compound. This is facilitated by the availability, relative cheapness and ease of applicability of these reagents and the neutral and fine nature of the product so formed.

DESCRIPTION OF THE INVENTION

As summarised earlier, the present invention is concerned with treating an aqueous suspension containing suspended solids derived from a reject or effluent of a de-inking plant for waste paper treatment. An insoluble, substantially white inorganic alkaline earth metal carbonate compound is precipitated in the aqueous suspension to provide entrainment of the suspended solids contained in the suspension in the form of a composite particulate material in which the suspended solids are bonded to the crystals of the precipitate of the white alkaline earth metal carbonate. The composite particulate material herein called the 'precipitate product' may be recovered and re-used as a pigment in known paper making or paper coating operations.

As used in this specification, "fines" means a material consisting of fibers, particles and the like which will pass through a round hold of 76 $\mu$m as defined in TAPPI Standard No T261cm-90. The solid matter present in the aqueous suspension to be treated will predominantly consist of particulate and fibrous material eg cellulose fibers. Generally, the particulate and fibrous material present in the suspension will contain at least 75% by weight and usually will consist of at least 90% by weight, of particles and fibers which are fines. The de-inking plant reject sludge and the aqueous suspension obtained from it to be treated will usually also contain organic materials, eg dyes, and polymers, eg latices and other adhesives, which are sticky and/or highly colored. These organic materials generally will constitute not more than 5% by weight of the solid organic material present in the aqueous suspension.

Generally for a de-inking reject sludge the solids content is between 20% and 70% of the sludge, the remainder of the sludge being moisture, mainly water. The organic content of the solids may vary from about 20% to about 80% by weight and, apart from up to 5% carbon (from paper printing ink) and other minor solids, the remainder is inorganic material, eg kaolin clay, calcined kaolin, calcium carbonate and other inorganic pigment additives as referred to above.

Surprisingly, the formation of the precipitate product in an aqueous suspension obtained from a de-inking effluent addresses all of the problems described above. We have found that formation of such a precipitate product can provide various benefits, namely (a) it can increase the brightness of the original suspended solid material to a level where the unacceptable darkness and discoloration can be substantially replaced by an acceptable degree of whiteness; (b) it will aggregate the suspended fine solid material to a size which is easier to retain and dewater; (c) it will remove soluble material from the water and the water purity (as measured by chemical oxygen demand) will improve; (d) it will entrain stickies within the precipitate product thereby making the resultant composite particulate material comprising the particulate product less tacky. This unexpectedly avoids the problem of stickies concentrating.

The net result is that the precipitate product formed in the method of the present invention by treating an aqueous suspension obtained from a reject from a de-inking plant by a carbonate precipitation step is unexpectedly recoverable and reusable in paper making or paper coating without having an unduly deleterious effect on the paper making or coating process in which they are reused. Also, the water from which such precipitate product is separated can be purified to an acceptable state where it can be re-used in de-inking or in paper making.

Thus, it has been found that the method according to the present invention can be used to obtain from a de-inking plant sludge which has a noticeable gray color, a precipitate product which is sufficiently light in color to be useful for recycling for re-use in a paper making process.

Thus, surprisingly and beneficially the present invention allows useful material to be recovered from de-inking reject sludge without having to separate the ink from other material in the reject, and allows the costs of disposing of such sludge to be reduced or eliminated as well as providing a cheaper pigment source for use in paper making.

The aqueous suspension which is treated in step (i) in the method according to the present invention may comprise slurry or sludge obtained from a flotation process in a de-inking plant. For example, the aqueous suspension in which the insoluble carbonate is precipitated may comprise the froth product recovered from the microflotation cells which are used to treat the water separated from the pulp in various stages of a process for preparing a useful sheet forming material from waste paper, and especially from printed waste paper.

Alternatively, the aqueous suspension in which the insoluble carbonate is precipitated may comprise the froth product from the main flotation stage of a plant for de-inking of the waste paper, as this generally contains less ink residue than waste paper from other sources. When the product comprising precipitate of insoluble carbonate and entrained fine particles is intended for recycling to a plant producing newsprint, the aqueous suspension which is treated in accordance with the invention may be the dilute suspension.

Desirably, the solids content of the aqueous suspension to be treated in step (i) of the method according to the present invention comprises less than 10%, eg from 0.5% to 5% especially from 1% to 3% by weight of the suspension. The solids content may increase to from 1% to 20% by weight after formation of the precipitate product. The weight ratio of (a) suspended solids (eg mainly fines) originally present in the aqueous suspension prior to the reaction to provide the precipitation step to (b) precipitate crystals formed by the method may be in the range of from about 1:9 to about 9:1, particularly from 30:70 to 70:30.

The said precipitate product present in the said suspension after completion of the precipitation step (i) may comprise at least 95% by weight preferably substantially all of the solids present in the suspension produced following the treatment involving precipitation.

Desirably, no separation of solid particulate material from the aqueous suspension occurs during or between application of the reagents applied to form the said precipitate. In other words, the concentration of non-consumable suspended solids (excluding formed precipitate) remains the same during addition and reaction of the reagents applied to produce the precipitate. As described below, the reagents may be respectively calcium oxide or hydroxide and carbon dioxide to produce precipitated calcium carbonate which bonds to the non-consumable suspended solids to form the composite particulate material comprising precipitate product.

The fines component present as inorganic particulate material in the treated aqueous suspension in the method according to the present invention may comprise particles having an average size less than about 50 $\mu$m, in many cases less than 5 $\mu$m. The particles may be finely divided, ie they may generally have an average particle diameter smaller than 2 $\mu$m, desirably smaller than 1 $\mu$m, and in some cases smaller than about 0.5$\mu$m.

The aqueous suspension may be pre-treated prior to the treatment step (i) as described above to render the suspension suitable for treatment. For example, the suspension may be concentrated or diluted (usually diluted) as described hereinafter to achieve the solids concentration specified above or the solid material contained therein may be subjected to a processing step, eg chemical treatment such as by a surface treatment agent in a known way to give a surface chemical and/or physical functionality or a mechanical step such as comminution, eg by milling or grinding.

Where the aqueous suspension to be treated in the method according to the invention contains less than the appropriate level of solids, ie less than 0.5% by weight, it may be concentrated in a known way, eg using dissolved air flotation or centrifugation or other known processes. Similarly, the stream if concentrated initially may be diluted, eg to a 2% solids level, if required, using clean water.

The form of crystals of precipitated alkaline earth metal carbonate produced in the precipitate product by step (i) of the method according to the present invention is not critical to achieve the objects described above. In general, a mixture of known crystal forms will be produced. However, it may be desirable to precipitate in a known way crystals which are predominantly of a selected form, eg calcium carbonate crystals which are aragonite or calcite crystals of the scalenohedral or rhomobohedral form. It will be apparent to those skilled in the art how to select the precipitation reaction conditions to give a predominantly selected crystal form.

The aqueous suspension of the precipitate product, ie composite particulate material comprising alkaline earth metal compound precipitate and entrained and bonded solids formed in the method of the present invention may be treated so as to separate partially or fully the aqueous host medium from the precipitate product using one or more separation processes which may be known processes. For example, processes such as filtration, sedimentation, centrifugation or evaporation may be used. The separated aqueous medium, eg water, may, optionally with further purification or clarification by one or more chemical, biochemical or mechanical processes which may be known per se, be recycled for reuse, eg in a de-inking plant or in a paper mill, eg for use in diluting the paper making stock or for use as showers for washing machinery.

The separated solids comprising the precipitate product may be assessed for quality control by measurements taken on samples and subsequently delivered to a storage tank and thereafter supplied as necessary for use in a user application, eg for use as a filler or pigment for making paper making or paper coating products, eg in a paper mill. The solids containing suspension may if required to re-diluted for use at the user plant.

It is not necessary for the aqueous suspension containing the precipitate product formed by the method according to the present invention to be dewatered prior to supply for use in a user application, eg re-use in a paper mill. The aqueous suspension or slurry containing the precipitate product may be delivered to a storage tank or directly to the user plant without substantial dewatering.

Where the precipitate product is to be re-used as a filler in a paper making composition, eg in a mill associated with the de-inking plant which discharged the effluent treated by the method according to the present invention, the precipitate product may be supplied to the mill in one of various concentrations in water. The concentration may range from dilute suspension form to dry particulate solids. The precipitate product after formation in the method according to the present invention may or may not be treated as appropriate, eg by dewatering or not, so that it may be delivered to the user plant, eg paper making mill in the required concentration.

The extent of dilution or concentration of the form in which the precipitate product is added to a paper making composition does not critically affect the properties of the resulting paper sheet. It may, however, for economic and practical reasons be more suitable to supply the product in the form of a concentrated pumpable aqueous slurry whose concentration is limited only by the rheological behaviour of the slurry, ie its pumpability. Where the product is supplied for use in a process at another location it may be preferable to dry the product prior to transport. Where the precipitate product has been concentrated or dried prior to delivery and subsequently re-dispersed in or diluted with clean water prior to re-use, the concentration and dilution steps do not materially affect the usefulness of the product.

In any event, as will be clearly evident to those familiar with the paper making art, the product may be blended in various proportions with conventional filler materials, eg precipitated or natural, eg ground calcium carbonate, kaolin and other clay minerals, metakaolin, talc, calcium sulphate etc, the ingredients and composition as well as the host fibers being selected according to the quality of paper required to be produced. In general, these materials are likely to be in slurry form when they are mixed.

The paper maker will normally select the concentration of the precipitate product (produced in accordance with the present invention) in aqueous suspension and the delivery rate of the suspension at the point of addition to the paper making composition, eg aqueous furnish or suspension of cellulose paper making fibers. As noted above, this may require re-dilution of a suspension which has been delivered to the paper mill in concentrated form. Generally, the suspension added may contribute precipitate product which forms up to 30% by weight of the solids content of the paper making composition. Where other fillers, eg conventional inorganic particulate material such as one or more of kaolin, metakaolin, calcium sulphate, mica, talc, titanium dioxide and ground or precipitated calcium carbonate, also form part of the filler content of the paper making composition a total filler composition of up to 30% by weight of the paper composition may be employed.

In the method of the present invention, the alkaline earth metal carbonate precipitate may be formed by introducing into the aqueous suspension to be treated a source of alkaline earth metal ions and a source of carbonate ions. This may be carried out as a batch process or a continuous or semi-continuous process. Where a batch reaction is to be employed, this is carried out in a reaction vessel into which the aqueous suspension to be treated, optionally after concentration or dilution as appropriate, is introduced. This will form the desired precipitate of alkaline earth metal carbonate in situ which will entrain and bond to the suspended solids already present in the used water. The reagent which provides alkaline earth metal ions is preferably uniformly distributed throughout the aqueous suspension to avoid local concentration gradients. When that reagent is sparingly soluble, as is the case with calcium hydroxide, thorough mixing is desirable. It is also desirable that the suspension should be agitated whilst the other reagent, ie that to produce carbonate ions, is added in order to ensure that the precipitate crystals are formed in an even distribution.

It is preferred to add the source of alkaline earth metal ions followed by the source of carbonate ions; desirably addition of the source of carbonate ions is continued until the pH of the suspension remains at a value in the range 7 to 9. A precipitate product which gives good light scattering properties may be made in this way as exemplified hereinafter.

The temperature of the treated aqueous suspension may, for example, be selected to be in a preferred temperature range, eg 35° C., to 55° C., within the general temperature range 10° C. to 80° C., taking into account the predominant form of crystals required (if any).

Whether the alkaline earth metal oxide is slaked in waste water or in fresh water, the water may be at a temperature in the range 10° C. to 80° C., eg a temperature in the range from 40° C. to 50° C., and the suspension of the alkaline earth metal oxide in the water is preferably agitated vigorously for a time of up to 30 minutes to ensure that the slaking is complete. The suspension may optionally be cooled after slaking.

If desired, a reducing or oxidizing bleaching agent may be added to the suspension containing the precipitate product in order to improve its whiteness.

As another example of re-use of the product of the method according to the present invention, a paper coating composition may be formed using the precipitate product by mixing an aqueous suspension of pigment material comprising the precipitate product optionally together with other pigments together with an adhesive and other well known minor additives employed in paper coating compositions. The other pigments may for example comprise one or more of kaolin, calcium carbonate (which may be ground or precipitated), calcium sulphate, mica, titanium dioxide, talc and so called plastic pigment. The adhesive may form for example from 4% to 20% by weight based on the total dry weight of pigment or pigments present. The adhesive may be one of the known paper coating adhesives employed in the art, eg chosen from the group consisting of starches, proteinaceous adhesives such as casein and latices of, eg styrene butadiene rubbers and acrylic polymers. The paper coating composition may also include as an optional minor additive a thickener, eg in an amount of up to 2% by weight based upon the total dry weight of pigment or pigments present. The thickener may comprise one or more substances employed as thickeners in the prior art, eg sodium carboxymethyl cellulose or synthetic acrylic thickeners. Other optional minor additives include sizing agents, optical brighteners or whiteners, solubilizers, rheology modifiers and the like.

The paper coating composition may be formed by mixing together an aqueous suspension of the precipitate product of the method according to the present invention, preferably also containing a dispersant, eg an anionic polyelectrolyte such as a polyacrylate salt, optionally with one or more further aqueous dispersed suspensions containing other pigments, with the adhesive and any other optional constituents eg thickener, in a manner familiar to those skilled in the art.

Embodiments of the present invention will now be described by way of example only with reference to the accompanying drawing and Examples.

BRIEF DESCRIPTION OF THE DRAWING

The accompanying drawing is a flow diagram of a de-inking plant for recovering re-usable cellulosic material from printed waste paper, modified in accordance with an embodiment of the present invention.

DESCRIPTION OF EMBODIMENTS OF THE INVENTION

Figure 1:
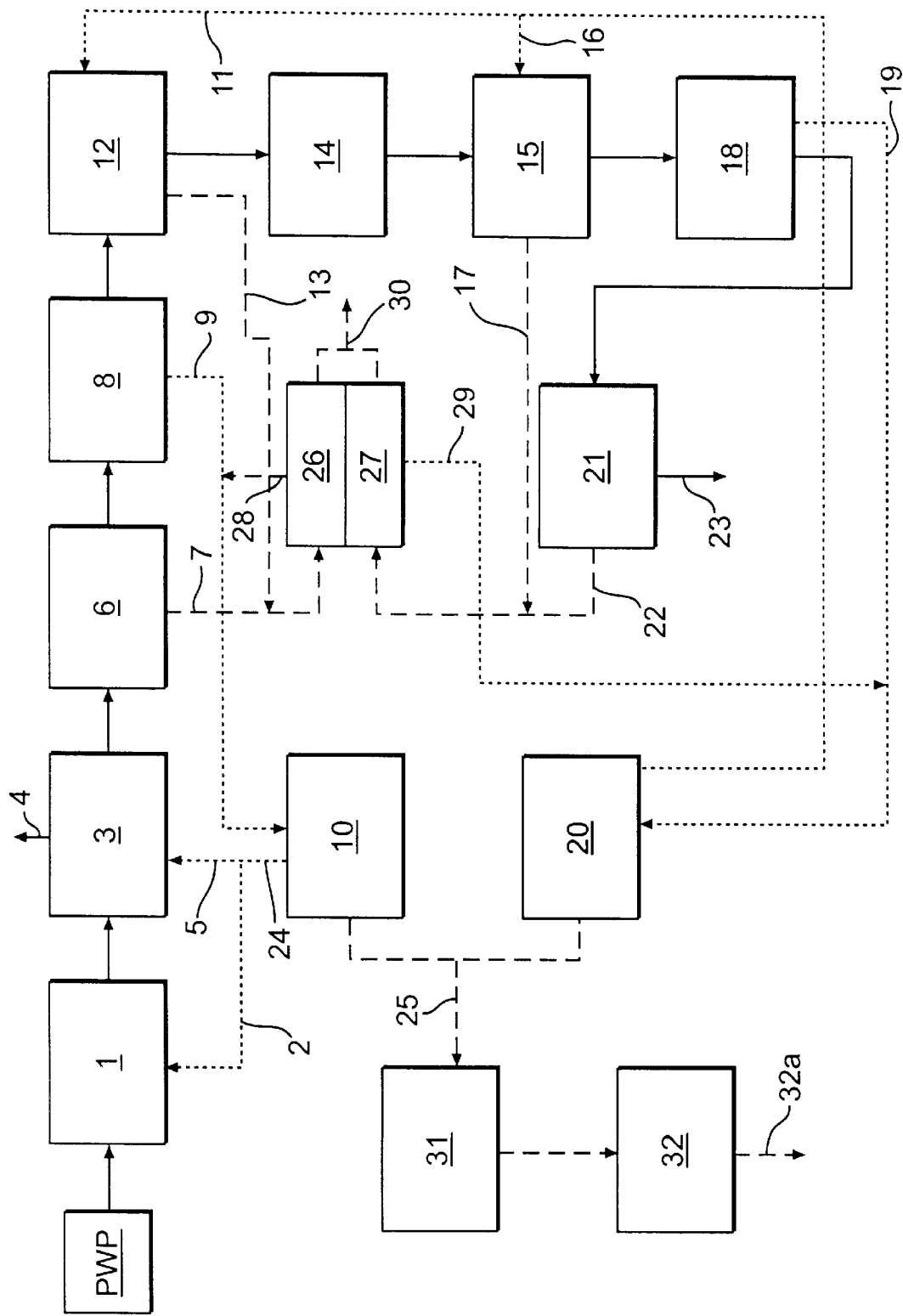

Printed waste paper, PWP, is pulped in a pulper with water containing sodium hydroxide, sodium silicate and a dispersing agent. Most of the water used has been recycled to the pulper from a later stage in the process through a conduit 2, as will be explained below. The pulp prepared in the pulper is passed through a screening system 3 which removes at 4 large items of contamination such as staples, paper clips and pieces of grit, and also a substantial part of the low density contaminants such as particles of plastics materials, and agglomerates of sticky material derived from adhesives, sizing reagents and pitch. Recycled water from a later stage in the process is delivered through a conduit 5 to assist the passage of fibers and fine particles through the screens and the discharge to waste of coarse materials retained on the screens.

A collector reagent is then added to the aqueous suspension which has passed through the screening system, and the suspension is subjected to froth flotation in one or more flotation cells 6. A substantial proportion of the ink particles in the size range from 20 to 200 $\mu$m in the suspension are removed in the froth which overflows from the top of the cells at 7 and a product depleted in ink is withdrawn from the bottom of the cells and transferred to a dewatering stage 8. In this stage cloudy water containing fine organic and inorganic particles is separated from the pulp and transferred through a conduit 9 to a first microflotation stage 10. The thickened pulp from the dewatering stage 8 is diluted with recycled water supplied through a conduit 11 and is washed on fine screens 12. Washing reject passing through the screens is removed through a conduit 13. A further dose of a dispersing agent is added, if necessary, to the pulp which is retained on the screens 12, and the pulp then enters a dispersion stage 14 where it is subjected to intense mechanical agitation in which any remaining ink agglomerates are broken down to particles not larger than about 20 $\mu$m and are prevented from reagglomerating. The dispersed suspension is then passed through a second screening stage 15 which removes any remaining coarse particles and agglomerates and discharges them through a conduit 17. The screens are supplied with recycled water through a conduit 16 to assist the separation process.

The aqueous suspension passing through the screens is then subjected to a second dewatering stage 18. Cloudy water containing fine organic and inorganic particles is withdrawn from this stage through a conduit 19 to a second microflotation stage 20. The dewatered pulp is washed on a further set of fine screens 21 and the washing reject which passes through the screens is discharged through a conduit 22. The pulp which is retained on the screens 21 is discharged at 23. This pulp is substantially free of ink particles and is suitable for use as a source of cellulosic fibres in a sheet forming process.

The froth product from the flotation stage 7 and the washing reject which passes through the screens 12 pass through conduits 7 and 13, respectively, to a dewatering stage 26, from which cloudy water is discharged through a conduit 28 to join the cloudy water flowing through conduit 9 to the microflotation stage 10. A suspension of the coarse particles and agglomerates which were retained an the screens 15 flows through a conduit 17, together with the washing reject passing through screens 21 and flowing through conduit 22, to a dewatering stage 27, from which cloudy water is discharged through a conduit 29 to join the cloudy water flowing through conduit 19 to the microflotation stage 20. A thickened effluent material is discharged from the dewatering stages 26 and 27 at 30.

The cloudy water passing through conduits 9 and 28 to microflotation cell 10, and through conduits 19 and 29 to microflotation cell 20, is charged with compressed air which comes out of solution as the cloudy water enters the base of the microflotation cells in the form of very fine bubbles which pass up through the cells carrying with them most of the suspended particulate material. A flocculant, such as polyacrylamide, may be added to the cloudy water entering the microflotation cells to cause the fine particles to clump together. Bentonite may also be added to adsorb and remove any sticky material present in the cloudy water. Clarified water is discharged from the bottom of microflotation cell 10 through conduit 24 to supply the pulping stage 1 and the first screening stage 3 through conduits 2 and 5, respectively. Similarly, clarified water is discharged from the bottom of microflotation cell 20 to the screening stages 12 and 15 through conduits 11 and 16, respectively. The froth product overflowing from the top of microflotation cells 10 and 20 at 25, which product comprises an aqueous suspension containing from about 2% by weight to about 8% by weight of fine organic and inorganic particles, is treated, in accordance with the invention, with calcium hydroxide in mixing tank 31 and the treated suspension is carbonated with carbon dioxide-containing gas in a reaction vessel 32, as described in the following Examples Output product is extracted via outlet 32a.

EXAMPLE 1

The froth product from the microflotation cells 10 and 20 of a de-inking plant producing waste paper pulp for use in making newsprint consisted of an aqueous suspension containing 6.74% by weight of dry solids.

A sample of the aqueous suspension was diluted with water to a dry solids content of 1.3% by weight. The temperature of the sample was raised to 50° C. and there was added to the sample sufficient of a suspension containing 148 g of calcium hydroxide per liter to provide, after carbonation with a carbon dioxide-containing gas, a weight of calcium carbonate equal to the weight of fine dry solid material in the sample. In other words, there was added sufficient of the calcium hydroxide suspension to provide 14.8 g of calcium hydroxide per liter of the sample. A gas containing 20% by volume of carbon dioxide, the remainder being air, was then admitted into the mixture of the froth product and calcium hydroxide, the temperature of the mixture being maintained at 50° C., at a rate sufficient to supply 0.048 moles of carbon dioxide per minute per mole of calcium hydroxide. The gas was passed through the mixture until the pH fell to 7.0 which corresponded to a time of about 20 minutes. An aggregated crystalline precipitate was formed, and samples of the aqueous suspension of this product, which resulted from the carbonation of the mixture of the froth product and calcium hydroxide, and which contained 2.6% by weight of dry solids, were tested for filtration rate and, after filtration and drying of the dry solid material in the suspension, for the brightness of the dry solids. Samples of the froth product. before treatment were tested in the same way. The results obtained are set forth in Table 1 below:

TABLE 1

|  | Before treatment | After treatment |
|---|---|---|
| Mineral content (% by weight) | 49.4 | 72.8 |
| CaCO$_3$ content (% by weight) | 11.4 | 53.3 |
| Kaolin content (% by weight) | 38.0 | 19.5 |
| Brightness (%) | 41.6 | 66.2 |
| Filtration rate | 0.06 | 0.45 |

The brightness of the dry solids was determined by measuring the reflectance of a prepared surface of the dried solids to light of wavelength 457 mm with a Carl Zeiss "ELREPHO" brightness meter and comparing the result with the reflectance of light of the same wavelength from an ISO standard brightness surface.

The filtration rate was measured by the procedure which was described in Appendix 1 below.

Hand sheets of paper filled with the aggregated crystalline precipitate obtained as described above were prepared in the following way. 2 liters of a suspension of a thermomechanical pulp containing 3.56% by weight of dry pulp was diluted to 10 liters with filtered water and was then disintegrated for 10 minutes in a turbine mixer, the impeller rotating at a speed of 1500 rpm. At this stage the stock contained approximately 0.7% by weight of dry pulp and the Canadian Standard Freeness was 130. The volume of stock was made up to 20 liters with filtered water and the consistency was checked by forming a paper sheet from a small sample by draining on a suitable wire screen and drying and weighing the sheet thus formed. Water was added if necessary to reduce the consistency to 0.3% by weight of dry pulp.

There was then added to the paper making stock thus formed and stirred in by hand sufficient of an aqueous suspension of the aggregated crystalline precipitate to provide 4% and 8% by weight, respectively, of the total dry solid material in the paper making stock. This was followed by the addition of 0.02% by weight, based on the total weight of dry solid material in the stock, of a retention aid.

Hand sheets were prepared from the filler containing paper making stock according to the procedure laid down in TAPPI Standard No. T205 om-88, "Forming handsheets for physical tests of pulp". For each hand sheet a sample of the stock was poured into the sheet forming machine and surplus water was removed.

The brightness, or percentage reflectance to violet light of the hand sheets was measured by means of a DATACOLOR 2000 brightness meter fitted with a No. 8 filter (457 nm wavelength).

The capacity of each sample of paper was measured by means of the DATACOLOR 2000 brightness meter fitted with a No. 10 filter (a green filter embracing a broad spectrum of wavelengths). A measurement of the percentage of the incident light reflected was made with a stack of ten sheets of paper over the black cavity of the brightness meter ($R_{oo}$). Of these ten sheets, the top five were from the sample of paper currently under test, and the remaining five were sheets from other samples which were used merely to ensure that the stack was completely opaque. The ten sheets were then replaced with the single sheet from the top of the stack of five test sample sheets over the black cavity and a further measurement of the percentage reflectance was made (R). The percentage opacity was calculated from the formula:

Percentage opacity=$100.R/R_{oo}$.

The procedure was performed five times with each time a different, sheet of paper on top of the stack, and the complete sequence of steps was then repeated to give a total of ten results from which the average value of the percentage opacity was determined.

The hand sheets from each batch were also tested for bursting strength by the test prescribed in TAPP] Standard No. T403 om-85. The bursting strength is defined by the hydrostatic pressure in kilopascals required to produce rupture of the material when the pressure is increased at a controlled constant rate through a rubber diaphragm to a circular area of the paper 30.5 mm in diameter. The area of the material under test is initially flat and held rigidly at the circumference but is free to bulge during the test. Samples of each sheet were also weighed dry, the weight of the dry sample being used to determine the weight per unit area of the paper in grams per square meter. The burst strengths were divided by the weight per unit area of the paper to give a burst ratio.

As a comparison, the experiment described above was repeated, but using as the filler in the paper making composition 4% and 8%, respectively, by weight of a precipitated calcium carbonate filler having a particle size distribution such that the weight median particle diameter was 3.0 μm.

As a further comparison, hand sheets were prepared from paper making stock which contained no filler and subjected to the same tests as are described above.

The results obtained are set forth in Table 2 below. For the hand sheets prepared from stock containing filler, the burst ratio was expressed as a percentage of the value obtained for the unfilled hard sheets.

TABLE 2

| Filler | | Brightness | Opacity | Burst ratio (% of value for unfilled sheet) |
|---|---|---|---|---|
| Unfilled | | 59.6 | 90.8 | 100 |
| Precipitated Calcium carbonate | 4% | 59.9 | 91.8 | 95.7 |
| | 8% | 59.8 | 91.2 | 86.9 |
| Aggregated crystalline filler | 4% | 57.0 | 92.8 | 97.3 |
| | 8% | 55.9 | 93.2 | 90.3 |

These results show that although the brightness values achieved when the aggregated crystalline material is used as the filler are not as good as those obtained with the proprietary filler, the aggregated crystalline material shows a better opacity and causes a smaller reduction in the strength of the paper than the proprietary filler.

EXAMPLE 2

Samples were taken of the froth product from the microflotation cells of a different de-inking plant, and the experiment described in Example 1 was repeated. The solids content of the froth product was found to 6.8% by weight, and the solids content of the suspension of aggregated crystalline filler which was produced after dilution of the froth product to a dry solids content of 2.25% by weight of dry and carbonation with a carbon dioxide-containing gas as described in Example 1 was 4.5% by weight. The properties of the solids in the initial froth product and in the suspension of the aggregated crystalline filler, and the filtration rates of the two suspensions, are set forth in Table 3 below:

TABLE 3

| | Before treatment | After treatment |
|---|---|---|
| Mineral content (% by weight) | 52.7 | 74.7 |
| CaCO₃ content (% by weight) | 12.3 | 54.3 |
| Kaolin content (% by weight) | 40.4 | 20.4 |
| Brightness (%) | 51.0 | 69.2 |
| Filtration rate | 0.03 | 0.26 |

The properties of hand sheets prepared and tested as described in Example 1 and containing the aggregated crystalline filler in accordance with the invention, the proprietary precipitated calcium carbonate, and no filler, respectively, are set forth in Table 4 below:

TABLE 4

| Filler | | Brightness | Opacity | Burst ratio (% of value for unfilled sheet) |
|---|---|---|---|---|
| Unfilled | | 59.6 | 90.8 | 100 |
| Precipitated Calcium carbonate | 4% | 59.9 | 91.8 | 95.7 |
| | 8% | 59.8 | 91.2 | 86.9 |
| Aggregated crystalline filler | 4% | 59.6 | 92.8 | 95.7 |
| | 8% | 60.4 | 93.6 | 88.9 |

Appendix 1

Filtration Rate Measurement Method

A small sample of the suspension of the mixed mineral produced was poured into a Buchner filter funnel provided with a piece of standard filter paper, the side arm of the filtrate flask being connected to the laboratory vacuum source. The filtrate was collected in a measuring cylinder inside the filtrate flask, and at intervals the volume of filtrate collected and the time which had elapsed since the start of filtration were recorded. The square of the volume collected was plotted graphically against the elapsed time, and a curve was obtained which had a large central straight line portion. The slope of this straight line portion was recorded in each case.

The relationship between the square of the volume of filtrate collected and elapsed time is given by the Carmen-Kozeny equation:

$$\frac{Q^2}{T} = \frac{2 \cdot A^2 \cdot P \cdot E^3 \cdot (y-1)}{5 \cdot v \cdot S^2 \cdot (1-E)^2 \cdot d^2}$$

where:  $Q$ is the volume of filtrate collected;

$T$ is the elapsed filtration time;

$A$ is the area of the filter medium;

$P$ is the differential pressure across the filter medium;

$E$ is the fraction of voidage in the filter cake;

$v$ is the viscosity of the suspending medium;

$S$ is the specific surface area of the particulate phase; and $d$ is the specific surface gravity of the particulate phase.

The slope $Q^2/T$ of the straight line portion of the graph plotted for each suspension gives a measure of the filtration rate in each case and, since A, P, V, S and d can be assumed to be constant under the conditions of the experiment, a standardized filtration rate F can be found to be given by:

$$F = \frac{Q^2 \cdot R}{T}$$

where:

$$R = \frac{\frac{1}{d} + \frac{W_c}{S_c}}{\frac{W_s}{S_s} - \frac{W_c}{S_c}}$$

where: $W_c$ is the weight fraction of water in the cake;

$S_c$ is the weight fraction of solids in the cake $W_3$ is the weight fraction of water in the suspension; and $S_3$ is the weight fraction of solids in the suspension.

What is claimed is:

1. A method of treating reject from a plant for de-inking waste paper, which reject comprises, in an aqueous medium, a mixture of suspended solids comprising at least ink particles, inorganic particles and fibers, which method includes the steps of:

(i) chemically treating an aqueous suspension comprising said reject by adding to the aqueous suspension a source of alkaline earth metal ions and a source of carbonate ions to react with the alkaline earth metal ions to form therein a composite particulate material comprising a substantially white insoluble alkaline earth metal carbonate compound precipitated by the reaction between said source of alkaline earth metal ions and said source of carbonate ions, which compound bonds to and entrains material comprising ink particles, inorganic particles and fibers contained in said reject, whereby the reject includes discoloration which is reduced by formation of the precipitate of the carbonate compound; and (ii) recovering the composite particulate material and delivering the composite particulate material for re-use as a pigment in a process for making or coating cellulosic sheet material.

2. A method as claimed in claim 1 and wherein the alkaline earth metal compound comprises calcium carbonate formed by reacting carbon dioxide with calcium hydroxide in the said suspension.

3. A method as claimed in claim 1 and wherein the composite particulate material is a particulate pigment material useful in a paper making or paper coating process.

4. A method as claimed in claim 3 and wherein the aqueous suspension containing the composite particulate material is dewatered.

5. A method as claimed in claim 1 and wherein in step (ii) the composite particulate material is delivered in relatively dilute form without substantial dewatering to be used in a paper making or paper coating process.

6. A method as claimed in claim 1 and wherein the composite particulate material is separated from water of the aqueous suspensions after separation, said water, which is clearer than the water of the aqueous suspension treated in step (i), is recycled for re-use.

7. A method as claimed in claim 1 and wherein said reject is a slurry or sludge produced from a flotation process of a waste paper de-inking plant.

8. A method as claimed in claim 1 and wherein the aqueous suspension at the start of the reaction in step (i) contains between 0.5% and 10% by weight of non-consumable solid material.

9. A method as claimed in claim 1 and wherein the weight ratio of (a) alkaline earth metal compound precipitated in step (i) to (b) originally suspended solids in the composite particulate material produced in step (i) is in the range of from 1:9 to 9:1 by weight.

10. A method as claimed in claim 9 and wherein the weight ratio of precipitated alkaline earth metal carbonate to suspended solids entrained thereby in the composite particulate material is in the range of from 30:70 to 70:30 by weight.

* * * * *